No. 669,927. Patented Mar. 12, 1901.
E. G. HOFFMANN.
LOCKING DEVICE FOR NUTS, &c.
(Application filed Mar. 20, 1900.)
(No Model.)
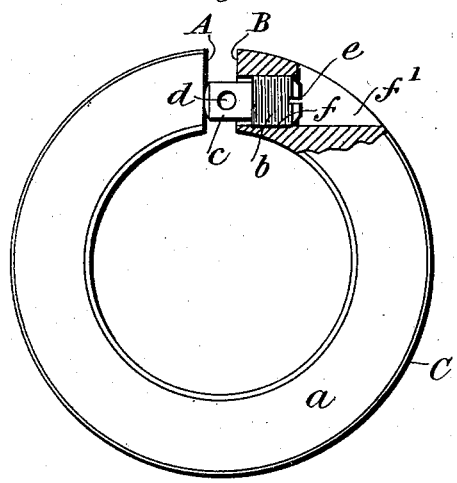
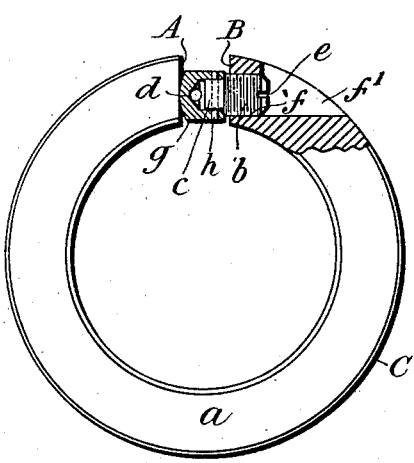
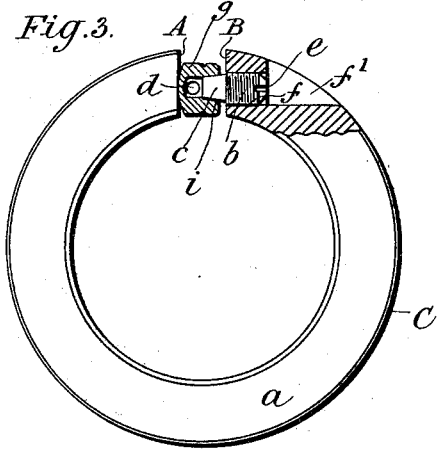
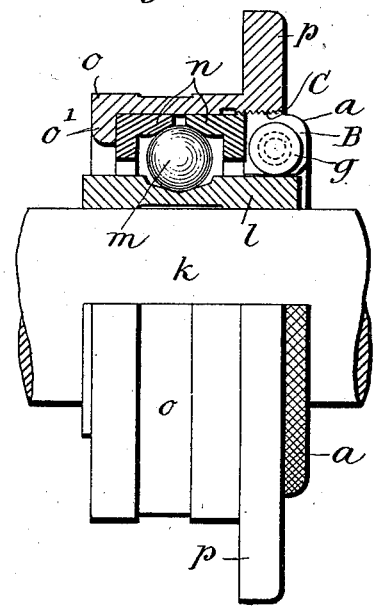
WITNESSES.
J. M. Scoble
E. C. Steckler
INVENTOR.
Ernst Gustav Hoffmann
by Redding, Kiddle & Greeley
Attorneys.

UNITED STATES PATENT OFFICE.

ERNST GUSTAV HOFFMANN, OF CHELMSFORD, ENGLAND.

LOCKING DEVICE FOR NUTS, &c.

SPECIFICATION forming part of Letters Patent No. 669,927, dated March 12, 1901.

Application filed March 20, 1900. Serial No. 9,358. (No model.)

*To all whom it may concern:*

Be it known that I, ERNST GUSTAV HOFFMANN, a subject of the German Emperor, residing at Chelmsford, in the county of Essex, England, have invented a certain new and useful Improvement in Locking Devices for Nuts and Like Parts, of which the following is a specification.

My invention relates to improvements in locking devices for nuts and similar threaded parts where an externally-threaded ring or nut engages with an internally-threaded part, the object of my invention being to provide a device which will not interfere with the screwing or setting of the nut or part in position and which will enable it both to be securely held in the exact position desired and to be readily loosened and unscrewed. Such a construction of externally-threaded ring or nut is used in several machines and apparatus, and I will describe my invention as applied to a ball-bearing, such as used for a shaft or like rotating part.

In the accompanying drawings, Figure 1 is an elevation of the ring or nut portion, partly in section, having my invention applied thereto. Fig. 2 is a similar view of a modification. Fig. 3 is a similar view of a further modification. Fig. 4 is a view of a cap-piece employed in Fig. 3; and Fig. 5 is a half-elevation and half-section of a ball-bearing, showing my invention applied thereto.

In carrying out my invention I employ a split nut or ring $a$, having two nearly abutting faces A B and an external thread C, and cause it to be expanded by means of a tangentially-arranged set-screw, one form of which is shown in Fig. 1, where it consists of a threaded end portion $b$ and a reduced head portion $c$, having holes $d$ for a tommy or suitable tool or faced to receive a wrench, though this is not so suitable. The end of the part $b$ is notched, as at $e$, or is otherwise formed to receive a screw-driver or suitable tool by which it may be introduced into the hole $f$, which is formed, as shown, tangentially in the part $a$, so that the head $c$ will be forced out of the face B against the face A, so that it may be set in position, the operation of expanding the ring being effected by a tommy or wrench acting on the head $c$, which is exposed in the gap between the faces A and B.

In Fig. 2 the head $c$ is provided with a cap $g$, adapted to bear on face A, which cap is secured to the head by a pin or rivet $h$, the cap being placed on the head after it is projected through the threaded opening $f$ and then secured by the pin. This cap enlarges the head, so that more holes $d$ may be employed, thus enabling the tommy to be used more expeditiously when rotating the screw.

Fig. 3 shows another modification, in which the head $c$ has a tapered end, the cap $g$ having a corresponding recess $i$, the cap thus being wedged upon the head by the force employed sufficiently to cause the head and cap to turn as one part. The cap may also be provided with a milled edge $j$, so that it may be turned, if required, by the fingers.

Fig. 5 shows the arrangement of the nut or ring in a bearing, the shaft $k$ being provided with a collar $l$, having a suitable track for a row of balls $m$, which are held between and bear on cup-rings $n$ $n$, retained in a suitable casing $o$, having an abutment $o'$ and an internally-screwed flange $p$, adapted to receive the nut or ring $a$.

In use the screw is introduced into the opening $f$ through a cut-away part or slot $f'$, and the nut or ring is screwed into the part, such as the part $p$ in Fig. 5, and serves to adjust one of the bearing-rings $n$ in that arrangement, and when this adjustment is attained or the nut or ring is otherwise screwed up to the position it is to occupy the tommy, wrench, or tool is applied to the exposed cap $g$ of the screw or to the head $c$, if no cap is employed, and the ring $a$ is expanded, so as to be tightly held in position. A reverse movement allows the ring to return by its elasticity, and it may then be withdrawn or set in a different position. It will be seen that for the purpose of setting up the cups or cones of ball-bearings and similar parts requiring nice and accurate adjustment the invention is particularly applicable, as no disturbance of the bearing takes place, the nut or ring portion being set without the slightest forcing or pressing into the desired position and being then expanded by the tangentially-arranged screw in the exact position in which it is to remain.

What I claim is—

1. In a locking device the combination with an externally-threaded and split ring and a surrounding coöperating member of a tangential screw adapted to expand said ring substantially as described.

2. In a locking device and in combination with a surrounding coöperating member an externally-threaded and split ring having nearly abutting faces and a tangentially-arranged screw projecting from one of the faces and abutting against the other and having means whereby said screw may be rotated substantially as described.

3. In a locking device and in combination with a surrounding coöperating member an externally-threaded and split ring having nearly abutting faces and a tangentially-arranged screw having a head adapted to abut against one of the faces of the ring and having means carried by the head and located between the faces of the ring whereby said screw may be rotated substantially as described.

4. In a locking device and in combination with a surrounding coöperating member, an externally-threaded and split ring having nearly abutting faces and a tangentially-arranged screw in a threaded opening of the ring the head of said screw being adapted to project into the space between the faces and means upon said head provided with holes for a tool for rotating said screw substantially as described.

In testimony whereof I have hereunto set my hand in the presence of two subscribing witnesses.

ERNST GUSTAV HOFFMANN.

Witnesses:
PHILIP M. JUSTICE,
EDWARD T. FOSTER.